United States Patent [19]
Smith

[11] 3,769,964
[45] Nov. 6, 1973

[54] SYSTEM AND METHOD FOR ACCURATELY MEASURING ARTERIAL BLOOD PRESSURE

[75] Inventor: Rulo Wayne Smith, Auburn, Ind.

[73] Assignee: Rieke Corporation, Auburn, Ind.

[22] Filed: Aug. 28, 1970

[21] Appl. No.: 67,872

Related U.S. Application Data

[63] Continuation-in-part of Ser. No. 56,169, July 9, 1970, abandoned, Continuation of Ser. No. 617,973, Feb. 23, 1967, abandoned.

[52] U.S. Cl. .......................................... 128/2.05 G
[51] Int. Cl. ............................................. A61b 5/02
[58] Field of Search .................. 128/2.05 A, 2.05 E, 128/2.05 G, 2.05 M, 2.05 Q, 2.05 R, 2.05 V

[56] References Cited
UNITED STATES PATENTS

| | | | |
|---|---|---|---|
| 3,535,067 | 10/1970 | Lesher et al. | 128/2.05 P |
| 3,486,499 | 12/1969 | Ven | 128/2.05 Q |
| 2,989,051 | 6/1961 | Zvidema et al. | 128/2.05 Q |
| 3,517,661 | 6/1970 | Buffington | 128/2.05 V |
| 2,845,060 | 7/1958 | Roman | 128/2.05 V |
| 3,056,401 | 10/1962 | Greenspan et al. | 128/2.05 G |

FOREIGN PATENTS OR APPLICATIONS

| | | | |
|---|---|---|---|
| 726,777 | 3/1932 | France | 128/2.05 Q |

*Primary Examiner*—William E. Kamm
*Attorney*—Woodard, Weikart, Emhardt & Naughton

[57] ABSTRACT

The system includes a sensor with a liquid filled bladder inside of a human body finger clamping device. A transducer connected to the clamping device translates the liquid pressure into an electrical signal. The pressure is adjustable externally and the resulting electrical signal is displayed on an oscilloscope to give an indication of the pressure applied by the liquid to a finger clamped in the finger clamping device. Blood pressure pulses sensed by the sensor produce an alternating current portion of the electrical signal and this is displayed on a chart recorder to give an indication of the pulse pressures. To determine blood pressure, a finger is inserted into the clamp and external pressure is applied to the finger. The external pressure is adjusted to the lowest pressure at which the pulse pressure indications are at a maximum value. The electrical signal will then have a maximum (peak) voltage and a minimum voltage displayed on the oscilloscope. True systolic pressure is represented by the maximum peak voltage and true diastolic pressure is represented by the minimum peak voltage.

The device is built to have a minimum of compliance, so that the natural expansion and contraction of the finger arteries is at a minimum. This prevents any stiffness of the artery walls from affecting the blood pressure reading. The difference between the true systolic pressure and a systolic pressure reading taken conventionally by collapsing an artery, is a measure of the stiffness of the artery.

3 Claims, 23 Drawing Figures

INVENTOR.
RULO W. SMITH
BY
Charles S. Penfold
ATTORNEY

INVENTOR
Rulo W. Smith
BY
Woodard, Weikart, Emhardt & Naughton
ATTORNEYS

Fig.23.

SYSTEM AND METHOD FOR ACCURATELY MEASURING ARTERIAL BLOOD PRESSURE

CROSS-REFERENCE TO RELATED APPLICATIONS

This application is a continuation-in-part of my application Ser. No. 56,169, filed July 9, 1970 and now abandoned. The application Ser. No. 56,169, filed July 9, 1970 was a streamlined continuation of my application Ser. No. 617,973 filed Feb. 23, 1967 and now abandoned. Both related applications were entitled "SYSTEM AND METHOD FOR DETERMINING PROGRESSION OF ARTHERIOSCIEROSIS AND ACCURATELY MEASURING ARTERIAL BLOOD PRESSURE."

BACKGROUND OF THE INVENTION

1. Field of the Invention:

The invention is primarily directed to a system for applying different external pressures to a blood carrying vessel for determining its resiliency and the actual blood pressure therein.

The subject invention relates generally to medical equipment and, more particularly, is directed to scientific equipment system or means for determining the degree of progression of arteriosclerosis and for accurately measuring arterial blood pressure, as distinguished from a conventional system which includes means based on sound for detecting the flow of blood through an artery for such purposes.

2. Description of the Prior Art:

The body in reality has two hearts which do not directly communicate with each other. A right heart, consisting of an auricle and ventricle, pumps the blood through the lungs and a left heart, having an auricle ventricle, pumps the blood through the body. These two hearts are bound together into one, but their union does not imply any direct communication insofar as the blood current is concerned. The heart is provided with valves so that the blood will always be forced in the correct direction. Thus, when the right ventricle contracts, a tricuspid valve prevents any back-flow to the right auricle. When the contraction is over, the ventricle is limp, a pulmonic valve prevents the blood from flowing back into the ventricle. In the same way on the left side mitral valve prevents the back-flow into the left auricle, and an aortic valve prevents the back-flow into the left ventricle. Contraction of the heart occurs about seventy times each minute and with each pulsation forcibly throws about 100 c.c. of blood from each ventricle.

When the ventricles contract and close the mitral and tricuspid valves, the muscle walls and the valves together make a sound which is best described by the syllable "lub." When the pulmonic and aortic valves close that makes a shorter, sharper sound, like the syllable "dub." The heart sounds produced by one contraction or "systole" are thus represented by the sounds, "lub, dub." Otherwise expressed, the contraction of the heart or peak pressure of a heart beat is referred to as the "systolic" pressure and the period during which it is limp and resting or at its lowest pressure is known as the "diastolic."

The sudden addition of about 100 cubic centimeters of blood to the contents of an artery already full stretches its walls still more, and starts a wave which travels down the arteries to the capillaries, and is called the "pulse wave" of the "pulse". If this wave was represented graphically its ascent, due to the sudden influx of blood, would be relatively sharp and its descent would be slower, since the blood is slowly squeezed onward by the over distended, elastic arteries into the small vessels. On the descent, there would be shown a small wave, called a "dicrotic wave" or "discrotic notch," which is produced by the snap of the aortic valve as it closes.

The arteries begin at the heart with the aorta and carry the blood to all parts of the body, dividing as they go into small and smaller branches until they reach the capillaries. The whole circuit of a corpuscle from the arotic valve around the body and back to this valve requires only about 23 seconds.

The arteries are always overfilled, and their walls are completely stretched by the large amount of blood within them. Since the arteries are very elastic and are distended, their elasticity between heart-beats constantly forces the blood onward into the small arteries and capillaries and keep up a continuous circulation, although the heart-beat is periodic.

The walls of the arteries are very strong, since the heart-beats keep the blood in them under relatively high pressure. Their walls consist of three layers. The inner layer is the "intima" which is a thin membrane of flat cells which furnish a surface suitable for contact with blood circulating within the artery. Surrounding the "intima" is a thick layer known as the "media" which consists of muscle fibers mingled with strands of strong elastic tissue. The "media" is the layer which makes the artery strong and able to stand the high pressure within it. It is also the most important layer of the vessel wall and being the most important is the most sensitive to injury. Outside of the "media" is a thick but rather weak layer of connective tissue, the "adventitia" which binds the artery to the structures through which it passes, and serves as packing to fill the crevices around the arteries.

Insofar as presently known, the only practicable means that was available prior to the year 1896 for evaluating blood pressure was by feeling the strength of the pulse In that year, an Italian named Scipione Riva-Rocci developed at the University of Padua the instrument known as the Sphygmomanometer which is currently used. This instrument among other things, comprises a mercury or aneroid manometer and an inflatable rubber cuff or band which is normally placed around the upper part of an arm or thigh of an individual. The cuff is inflated until it collapses the arteries embraced by it. Such collapse is detected by the cessation of the pulse at the wrist or ankle. An alternate method includes placing a stethoscope over an artery at a location just downstream from the cuff for detecting the sound or flow of the blood as the pressure is reduced in the cuff after first having applied pressure in excess of the blood pressure peaks.

The method perfected by Scipione Riva-Rocci had to do with "systolic" pressure and did not undertake the determination or ascertainment of the "diastolic" pressure.

An improved system of ascertaining "diastolic" pressure was developed several years later in the year 1905 by a Russian physician Nikolai Korotkov who after having evaluated the "systolic" pressure employed the technique of continually reducing the pressure in the cuff until the sounds heard in the stethoscope disappeared. The cuff pressure, as determined by the manometer, at which such sounds disappeared was read out as the "diastolic" blood pressure.

The equipment, method, systems or techniques attributed to the above named individuals are based on the premise that the arterial walls are infinitely soft. However, when such premise is viewed in cojunction with fluid mechanics, a living artery is a relatively thick walled resilient pressure vessel, in which its interior pressure is at all times greater than that externally thereof so that the walls are continually under variable pressure or tension. The natural size of an artery may be defined as that assumed by it if it were removed, the fluid drained out, with equal pressure applied to both its interior and outer surfaces. Otherwise expressed, such an artery is in a relaxed condition and subject to atmospheric pressure. Previously there were only two methods for accurately measuring blood pressure which were not affected by the characteristics of an artery wall. One was surgically implanting a transducer in an artery and running wires from it to monitoring devices. The other was inserting a needle into the artery and measuring the blood pressure of the blood at the outer end of the needle with a transducer. The disadvantages of these methods are numerous and well known. Among the disadvantages are risk of infection, clotting, hemorrhaging obstruction of a blood vessel, mental stress, or physical discomfort.

Other methods for the measurement of blood pressure were indirect methods which typically measured the external pressure it took to collapse the arteries. In such methods, the resistance of the artery walls to collapse will affect the indirect reading of blood pressure. For example, if the artery were very hardened and stiff, substantial external pressure would have to be applied to collapse the artery even if there were no blood pressure. This would cause an error of over 50 mm. Hg. pressure if a person had very hard arteries.

Even the newer techniques for indirectly measuring blood pressure which do not rely on collapsing the artery, have the shortcoming of allowing the artery walls to expand and contract. Thus, they will give erroneous readings in patients who have arteries that are hardened.

SUMMARY OF THE INVENTION

This invention involves a device and method for use in measuring blood pressure, and which is unaffected by the condition of the artery walls. The device comprises a first means for applying the low compliance an adjustable external pressure to a portion of an animal body, a second means for obtaining adjustable external pressures, and a third means for obtaining the maximum instantaneous pressures of the first means. The method involves mounting to a portion of an animal body a device which can apply with low compliance an adjustable external pressure to the portion of the animal body and which will indicate a maximum instantaneous pressure and a pulse pressure of the body against the device; and adjusting the external pressure applied to the portion of the body until the pulse pressure is at a maximum and the external pressure applied is at the lowest value at which the maximum pulse pressure is obtained. The maximum instantaneous pressure will then be a value which is very close to the actual systolic blood pressure.

This invention is believed to be the first indirect method for determining blood pressure which is unaffected by the condition of the arteries. It enables one to easily determine a parameter, or "stiffness factor," which is an indication of the stiffness of an artery. The stiffness factor is best determined by subtracting the actual systolic blood pressure as obtained by the present invention (or by either of the direct methods mentioned) from the apparent systolic blood pressure as obtained from conventional indirect blood pressure measuring techniques such as those which are obtained by collapsing the artery.

An object of the invention is to provide improved sensor assemblies which comprise a structure provided with a sensor element, adjustable means for firmly holding a portion of a subject in relation to the element, and means whereby pressure may be applied to the element to force the latter against such portions.

Another object of the invention is to provide a modified form of sensor assembly which comprises an elongated flexible band provided with a pair of separate contiguous chambers for receiving of liquid, means whereby the band may be held so that one of the chambers may be disposed in close relation to a portion of an individual's body, and means whereby liquid may be introduced into the other chamber for influencing the condition of the first mentioned chamber.

Additional objects of the invention reside in providing a system and/or method which offers advantages with respect to operation, efficiency, accuracy, utility, and safety.

Many other objects and advantages of the invention or inventions will become apparent after the description hereinafter set forth is considered in conjunction with the drawings annexed hereto.

DESCRIPTION OF THE PREFERRED EMBODIMENT

Figures 1, 2, 3, 4, 5, 6, 7:
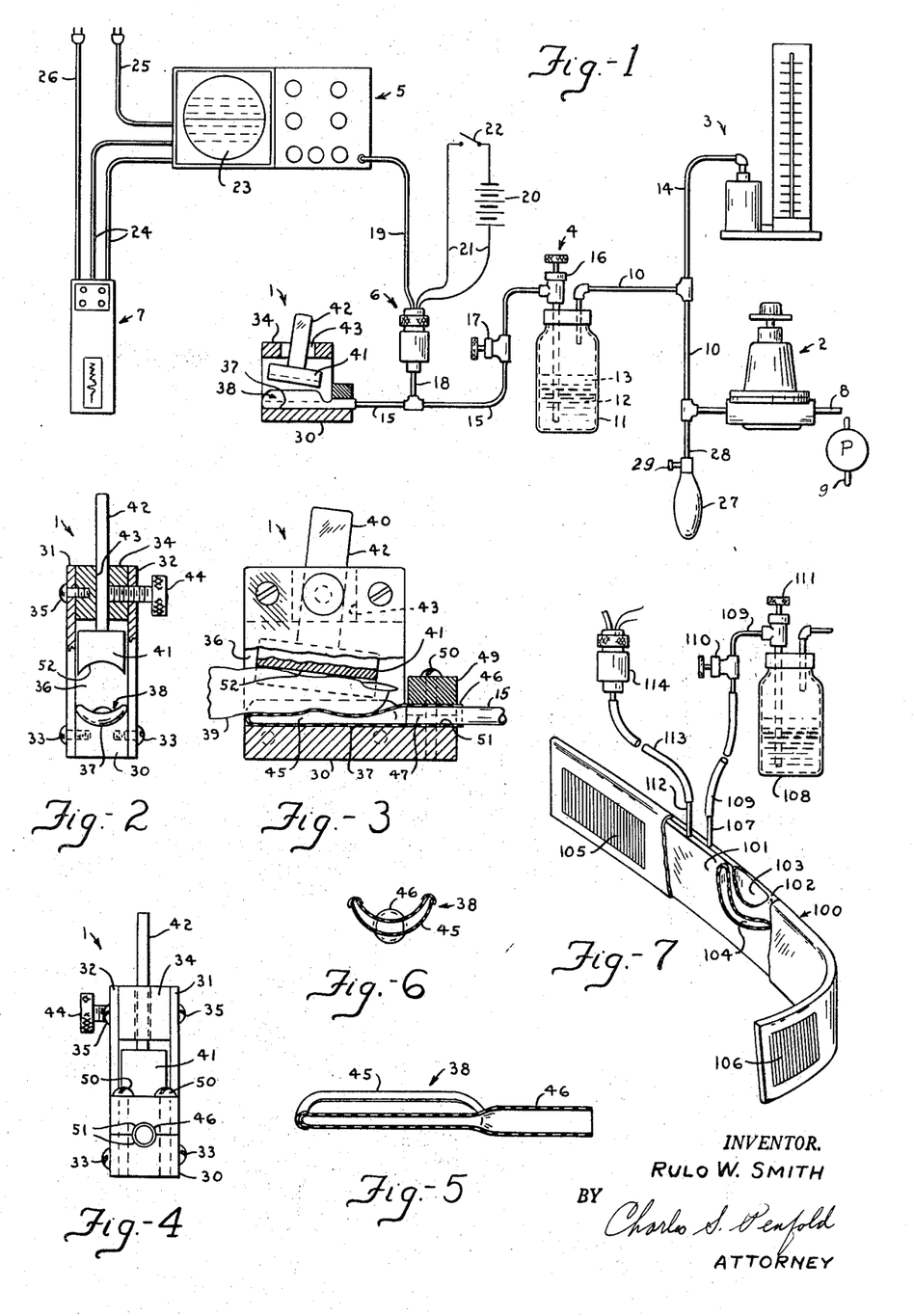
FIG. 1 illustrates a system embodying one or more inventions.
FIG. 2 is an enlarged end view, with portions in section, of a sensor assembly constituting a component of the system depicted in FIG. 1.
FIG. 3 is an enlarged side elevational view of the sensor assembly depicted in FIGS. 1 and 2, with portions in section.
FIG. 4 is an opposite end elevational view of the sensor assembly illustrated in FIG. 3.
FIG. 5 is an enlarged longitudinal sectional view of a sensor element constituting a component of the sensor assembly illustrated in FIG. 3.
FIG. 6 is a transverse sectional view taken through the element shown in FIG. 5.
FIG. 7 is a modified or second system which embodies the invention and employs a different form of a sensor assembly.

The system exemplified at FIG. 1 is one of several exemplified in the subject application and comprises a plurality of operatively connected components, including a sensor generally designated 1, a pump or pressure producing means generally designated P, a regulator 2, a manometer or pressure indicating means generally designated 3, control means generally designated 4, which is inter-posed between the regulator and sensor, a receiver generally designated 5, a pressure transducer or converting means generally designated 6 which is responsive to the sensor and transmits conditions or messages therefrom to the receiver, and a recorder 7 for recording and storing the transmitted conditions or messages to the receiver.

Referring more specifically to the system the pump P is connected to the regulator 2 by a line 8 and to a supply conduit or line 9. The regulator may be manipulated to regulate the flow of fluid through a conduit or a line 10 connected to the interior chamber of a reservoir 11 which is partially filled with a liquid 12 and has a barrier 13 therein which is responsive to fluid pressure from the pump. The manometer 3 is connected to the line 10 through a branch conduit or a line 14 and is provided with a scale for indicating variable pressures obtaining in the system. The liquid in the reservoir is connected to the sensor 1 by a conduit or line 15, with a needle valve 6 and shutoff valve 17 interposed between the reservoir and the sensor. The transducer 6 is connected to the line 15 through a conduit or line 18 and electrically to the receiver 5 through conductors in a cable 19. The sensor is adapted for association with a blood carrying vessel, such as an artery, and external pressure applied by the pump to the vessel through the sensor and the variations in the pressure of the blood in the artery are transmitted by the sensor to the transducer. The barrier 13 prevents aeration of the liquid in the reservoir 11, lines 15 and 18, a sensor element 38, and transducer 6. The conductors in the cable connect with an amplifier and controls provided on the receiver. A source of power, preferably in a form of a battery 20, is operatively connected to the transducer 6 by a pair of conductors 21 for generating the pressure variations received by the transducer into signals, messages, or impulses to the receiver. A switch 22 for an obvious purpose is interposed in one of the conductors 21.

The receiver 5 may be one of several conventional types but the one illustrate is in the form of an oscilloscope which has a screen 23 for visibly presenting the messages or impulses transmitted by the transducer. This receiver may be operatively connected to a recorder 7 in a conventional mode by a plurality of conductors in a pair of cables 24 and the receiver and recorder are adapted for selective connection to a power source through conductors in cable 25 and 26.

A device or pump preferably in the form of a resiliently flexible bulb 27 may be utilized in conjunction with the pump P and regulator 2 for critically controlling the pressure in the system or if found desirable the device 27 may be utilized independently of the pump P and regulator for obtaining the desired pressure in the system. The device is shown as being connected by a line 28 to the line 10 with a bleed valve 29 adjacent thereto.

Any one of several forms of sensors may be used in conjunction with the system as evidenced by the subject disclosure. The sensor 1 is best exemplified in FIGS. 2 through 6 and comprises an assembly which includes a box-like structure having a rectangular base 30, a pair of vertical side walls 31 and 32 secured to the base by screws 33 and an upper block 34 secured by screws 35 between upper portions of the side walls and in spaced parallel relation to the base to define a chamber 36. An upper surface of the base is preferably provided with concave seat 37 which extends throughout the major portion of its length and the sensor or pressure responsive element 38, above referred to, and preferably in the form of an elongated hollow resilient body, is disposed in the seat for engagement by a digit 39 of an individual as depicted in FIG. 3.

Means are provided for adjusting or holding a digit in relation to the sensor element and this preferably includes a member 40 which has a pressure shoe 41 disposed generally length-wise in the chamber 36 and a tang 42 which extends transverse to the shoe and through an opening 43 in the block to constitute a handle whereby to facilitate manual adjustment of the shoe in relation to the digit. A locking device preferably in the form of a thumb screw 44 is threadedly connected to the side wall 32 and/or block 34 for engaging the tank 42 whereby to firmly lock the member in place after the shoe has been correctly applied to the digit. It should be noted that the shape and size of the tank 42 and opening 43 allows the member to be tilted in a substantially vertical plane. An under surface of the shoe 41 is preferably provided with a concave seat 52 which receives and assists in locating a digit in relation thereto. The concave seats 37 and 52, in combination, serve to receive and facilitate correct stabilization of the digit in relation to the element.

The sensor element 38 may be designed and constructed in various ways but is preferably elongated and comprises a hollow extremity 45 disposed in the chamber 36 and which is normally substantially concave-convex in cross-section for nesting in the concave seat 37 in the base and facilitating accommodation of the digit 39. The element also preferably includes a hollow cylindrical extremity 46 for receiving an end 47 of the conduit 15. A fitting 49 is detachably secured by screws 50 to the base 30 for clamping the extremity 46 about the conduit and the latter in firm relation to the base. It will be noted that the block and the fitting are provided with concave grooves 51 to promote the clamping action, as it is important that there is a sealed or fluid tight connection between the conduit and element.

In utilizing the invention to determine hardness of the arteries, it is important to determine two factors. One factor involves applying an external pressure sufficient to balance the actual blood pressure inside the artery. The instant this balance is obtained the artery may be considered to be of its "natural size". At external pressures above and below the "natural size" pressure the artery is deformed. At external pressures below the "natural size" pressure this deformity is due to the stretching of the artery walls and at pressures above the "natural size" pressure this deformity is due to the collapsing of the artery walls. At external pressures above the "natural size" pressure the artery will assume an oval shape as it is compressed and the oval will become more flattened as the pressure is increased until the artery is completely occluded. The change from one type of deformity to another affects the pulse pressure which is impressed on the transducer.

It must be kept in mind that the term external pressure refers to an average external pressure applied t6an animal body part and not to the instantaneous pressure between the device and the animal body part. The instantaneous pressure will, of course, vary with the pulsations of the arteries. These variations are referred to as the pulse pressure. The highest instantaneous uplse pressure is referred to as the peak positive pulse pressure and is equal to the maximum instantaneous (peak) pressure of the body against the device, known as peak pressure, minus the external pressure. The lowest instantaneous pulse pressure is referred to as the peak negative pulse pressure and is equal to the difference between the minimum instantaneous pressure of the body against the device and the external pressure. The term "animal body" or "body" is intended to encompass a human body as well as a body of a lower animal.

The invention involves the use of a low compliance device; in other words, the components employed according to the invention are chosen so that the amount of compression and stretching of components is kept at a minimum. This requires the use of liquid or solid in the sensor and prevents the use of a gas in the sensor. It also requires that the sensor or pressure responsive element 38 be made of a relatively inelastic material. In use, this device will maintain the finger arteries at an almost constant size, rather than allowing them to expand and contract as they would other wise naturally do.

The system illustrated in FIG. 1 has proven very efficient and acccurate in operation. The preferred procedure in operating the system comprises the steps of: depressurizing the reservoir 11; opening the needle and shutoff valves 16 and 17; inserting the digit 39 into the sensor assembly so that it rests in the concavo-convex extremity 45 thereof; normally ajdusting and pressing the shoe 41 against the digit to cause it to distort or compress the sensor element; locking the shoe in place by tightening the thumb screw 44; adjusting the needle valve 16 to nearly close the same; and slowly pressurizing the reservoir and noting on the screen 23 the pressures associated with the natural size of the arteries in the digit.

The sensor 1, through the agency of the pump P, serves to apply external pressure to an artery or arteries in a digit and the pressure variations or pulsations therein are conveyed to the transducer which converts or transmits such variations into electrical signals or messages to the receiver 5 through the agency of the power source 20. Amplifying means in the receiver 5 amplifies the signals or messages received from the transducer in order to develop and present the same on the screen or scope 23. If desired, the data presented on the screen may be recorded on an oscillograph, the recorder 7, or photographs or movies thereof may be obtained for future reference.

In determining very accurately the pressure at which the arteries are at their natural size, the external pressure is increased very gradually from a pressure below the blood pressure. As the external pressure is increased, the pulse pressure will also increase until a point just before the external pressure is at the natural size pressure. As the external pressure is increased beyond that point, the pulse pressure will decrease until the natural size pressure is reached and then increase again to a maximum value which will remain constant during further increases of external pressure until the external pressure approaches the pressure needed to occlude the artery.

Figure 23:
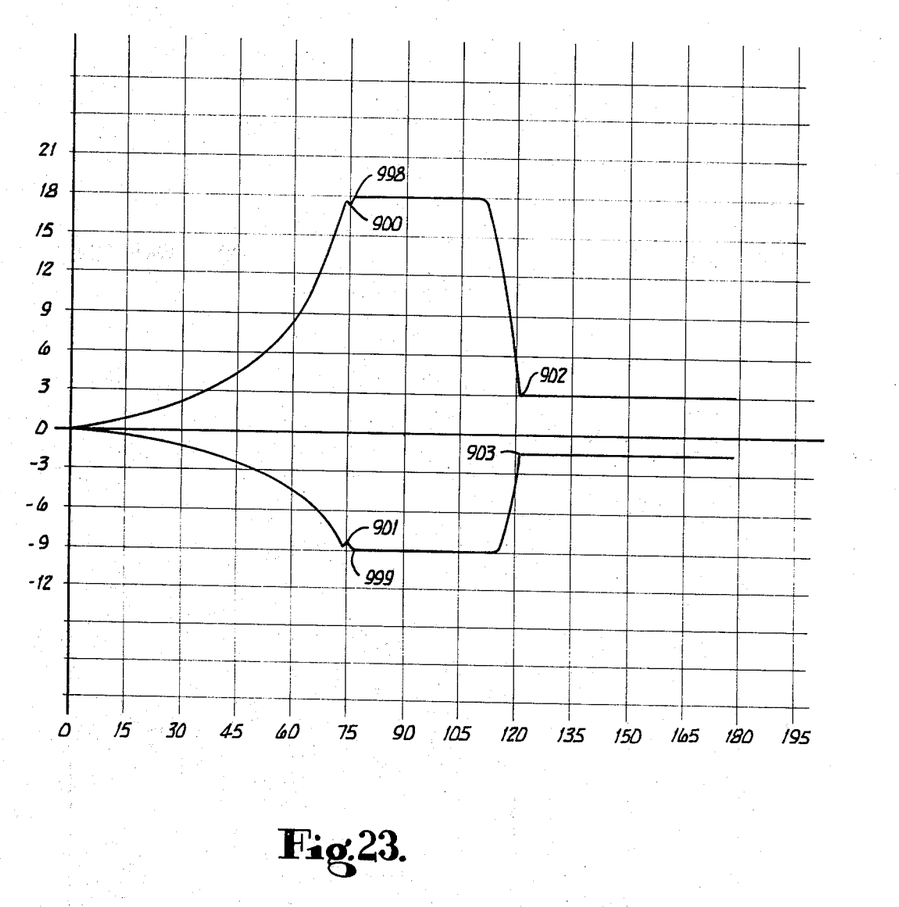
FIG. 23 is a graph showing the relationship between the average external pressure and pulse pressure when a low compliance system is used.

FIG. 23 illustrates the relationship of external pressure with pulse pressure. The peak positive and negative pulse pressure indications (in mm. H) are plotted against external pressure (in mm. Hg) in a typical situation. The natural size of the artery occurs here at 75 mm Hg. At this point the peak positive pulse pressure was 17 at point 900 and the peak negative pulse pressure was 8 at point 901. From the graph the blood pressure can be calculated as being 92/67 (75+17/75−8).

Since there is a very small range of external pressures at which the pulse pressure would tend to decrease with increasing external pressure, a quicker and nearly as accurate method of determining the pressure at natural size is to adjust the external pressure to the lowest pressure at which the pulse pressure is a maximum. This occurs in the hypothetical indicated on FIG. 23 at 76 mm Hg. When this method is used to calculate the blood pressure, the result is 94/67 (76+18/76−9) which is very close to the blood pressure calculated using the natural size of the artery. Note that points 998 and 999 were used rather than points 900 and 901.

When a pressure at natural size has been obtained the instantaneous blood pressure in the artery will be exactly the same as the instantaneous liquid pressure in the sensor, because the artery can not be compressed or stretched because a low compliance device is used. One can then measure the pressure of the liquid to determine the pressure of the blood. This is done by any one of several devices which may be connected to the transducer 6. The oscilloscope 5, if D.C. coupled, will display on screen 23 a waveform whose peak amplitude above zero volts will be proportional to the systolic pressure and may be calibrated to read systolic pressure. The minimum amplitude above zero volts will correspond to the diastolic pressure. The average amplitude above zero volts will correspond to the external pressure which will be the pressure at natural size.

In order to determine the progression of arteriosclerosis another factor is needed. My earlier approach to attainment of this second factor as disclosed in my aforementioned original case was determined by the amount of additional pressure required to collapse the artery to a predetermined configuration. The excess of additional pressure required to obtain such a configuration over that required to achieve the "natural size" condition of the artery was a parameter whose magnitude evaluated the stiffness of the arterial wall—in other words, the degree of progression of arteriosclerosis. To obtain the second factor, the external pressure was increased until, as monitored on the screen 23 of the scope 5 flattening or clipping is initiated at the "diastole" portion of the displayed wave form. In other words, external pressure was increased until the ratio of the peak positive pulse pressure to the peak negative pulse pressure changed. If this second factor or condition appeared at a pressure of 120 mm. Hg and the pressure at normal size was 86 mm Hg, then the parameter evaluating the stiffness of resiliency of the arterial wall in this situation would have been 120 mm. Hg minus 86 mm. Hg or 34 mm. Hg.

Such parameters evaluated in other individuals have covered a range of a low of 20 mm. Hg to a high parameter of 70. In one case history, an individual of the age of 48 at one time was examined with a conventional sphygmomanometer and had a reading of 175 mm. Hg at "systolic" pressure. This individual was placed on blood pressure reduction medication and at the time of taking the 70 parameter reading the spygmomanometer "systolic" reading would have been 145 and reducing this by 70 leaves an actual "systolic" blood pressure of 75. At the time of this reading the pulse pressure was 15 mm. Hg so the actual arterial blood pressure was 75/60 mm. Hg. In another case history, an individual has an actual blood pressure of 90/65 mm. Hg and a parameter of 35. In comparing these histories, the first individual considered to be "hypertensive" actually had a lower blood pressure than the latter individual who was considered to be "hypotensive."

In summarizing the above, the objective was to obtain a first determination at which an artery acted upon by the sensor attained its "natural size" or the amount of external pressure applied substantially corresponds to that in the artery. After this determination was made the external pressure was increased until clipping of the pattern on the screen was initiated. This excess of pressure over that producing the first determination of "natural size" or condition of the artery was a parameter in mm. Hg that evaluated the degree of progression of arteriosclerosis.

Upon further analysis I have found that a better method to determine a "stiffness factor" is available. The original parameter represented the hardness of the digital arteries. The digital arteries however, are subject to rapid change in characteristics as a result of heat, cold, emotions, and fatique. If the stiffness of the brachial artery or femoral artery is determined, the effects of heat, cold, emotion, and fatigue can largely be avoided. The brachial artery, being in the upper arm, is the preferred artery to use to measure a "stiffness factor." The actual blood pressure is still measured most easily at the finger with the finger sensor in the manner previously described. After determining the systlic and diastolic pressures, a convention cuff is placed around the upper arm and pressurized to occlude the brachial artery to obtain a conventional sphygmomanometer systolic blood pressure indication.

When the actual systolic blood pressure obtained by applicant's invention (or by either of the direct measurment techniques mentioned earlier) is subtracted from the apparent systolic blood pressures, as measured by conventional indirect methods, the difference will represent the pressure required to collapse an artery having no blood pressure to an occluded state. This difference typically ranges from 6 to 54 mm. Hg depending upon the stiffness of the brachial artery.

Using the data illustrated in FIG. 23, we can see that at points 902 and 903 the pulse has minimized at an external pressure of 121 mm. Hg. This is a typical conventional systolic blood pressure reading. Subtracting from this the actual systolic blood pressure indicated by point 900 we arrive at a stiffness factor of 29 mm. Hg (121-92 mm. Hg). Conventional indirect methods of measuring systolic blood pressure usually apply just sufficient pressure to collapse the artery to an occluded configuration. This pressure is said to represent the systolic blood pressure, but it actually represents the sum of the actual systolic blood pressure plus the pressure required to collapse an artery without any blood pressure to an occluded state.

The "stiffness factor" determined using the brachial artery is reliable and medically significant. Upon a determination that a patient suffered from a "stiffness factor" above normal for such patient's age and sex group, the physician should prescribe a diet low in cholestrol and saturated fats, low in calories and high in protein. If hypertension exits, a low salt diet would be in order and probably a diuretic, with proper safeguard against potassium depletion, prescribed. Suitable exercise outlined, a relatively stress free life encouraged, reduced intake of caffein and less cigarette smoking might well be urged.

Figure 8:
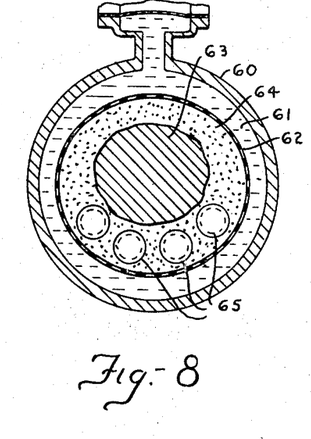
FIGS. 8, 9, and 10 are enlarged cross-sectional views which successively diagrammatically illustrate different conditions which exist in a part of an arterial network when the system is utilized.
Figure 9:
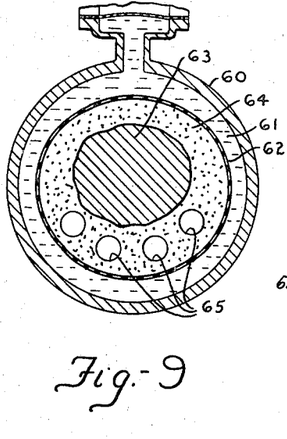
Figure 10:
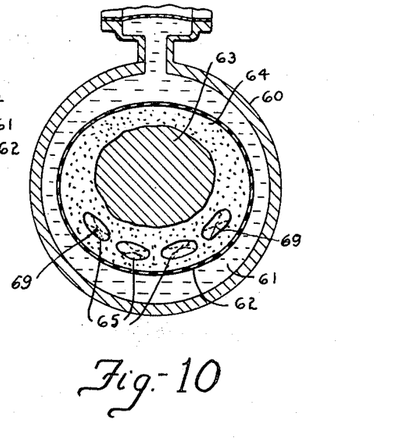

Reference should be made to FIGS. 8, 9 and 10 which diagrammatically represent three different arterial conditions, two of which may be obtained by utilizing the various systems exemplified in the subject application. These figures, among other things, show a tubular member 60 having a chamber therein containing a liquid 61 which substantially surrounds a cylindrical resiliently flexible sensor element 62 in which a digit is confined. The digit shown includes a bone 63, tissue and/or flesh 64, and a plurality of arteries 65.

In FIG. 8 the arteries are represented as being of their normal expanded or distended size or condition with the blood circulating therethrough. In FIG. 9 the arteries are shown as being reduced to their "natural size" or condition which is the result of having applied pressure to the liquid to contract the arteries. In FIG. 10 the arteries are shown as being collapsed to a condition which is the result of applying increased or additional pressure to the liquid. In other words, in FIG. 9 the arteries have been brought to their "Natural size" or condition by external pressure and in FIG. 10 to a partially collapsed condition due to additional pressure.

Figure 11:
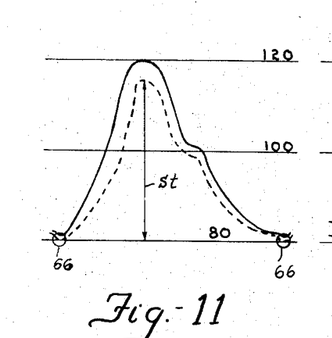
FIGS. 11, 12, and 13 illustrate graphically the conditions which exist in FIGS. 8, 9 and 10.
Figure 12:
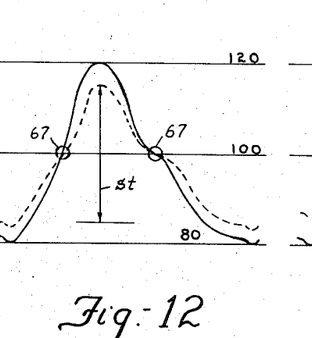
Figure 13:
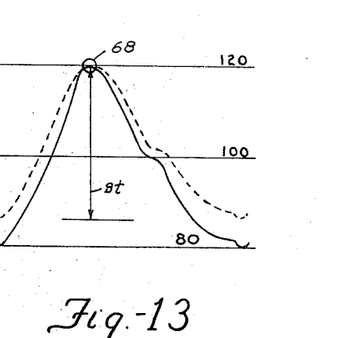

More specifically, attention is directed to the fact that: FIGS. 11, 12 and 13 respectively complement FIGS. 9, 8 and 10 and represent a hypothetical situation in which the actual "systolic" pressure is 120 and "diastolic" pressure is 80; the full lines represent the actual arterial pressure in mm. Hg; the dotted lines the transducer pressures; and the symbol St the pressure swing of the pulse pressure on the transducer, (in other words St is the sum of the peak positive and negative pulse pressures).

When the artery is in tension the transducer experiences a pressure lower than the actual blood pressure and when the artery is in compression, the transducer has impressed upon it a pressure greater than the actual blood pressure.

In FIG. 11, for example, the artery is exemplified as being in tension at all times except at the instant when the "diastolic" blood pressure is 80 at which instant the artery is of natural size as represented at the instant 66.

In FIG. 12, for example, the artery is in tension at blood pressures greater than 100 and is of a natural size as represented at the instant 67 when the blood pressure is 100 and in compression at blood pressure less than 100.

In FIG. 13, for example, the artery is of a natural size at the instant 68 when the blood pressure is 120 and in compression at all other times.

Attention is further directed to the fact that the arteries may be compressed to the full line configurations shown in FIG. 10 or to any other configurations or conditions, such as the dotted line configuration indicated at 69, in which opposed portions of the arteries are engaged. However, it must be remembered that unless the external pressure is varied, the size of the artery will remain very nearly constant and will not expand and contract with the pulse. This is due to the fact that applicant's invention is built with materials having low compliance and the fact that a nearly incompressible liquid is used in the inelastic bladder, as well as the fact that the body part is rigidly clamped in place. This is essential, since if the arteries were allowed to expand and contract significantly, their characteristics would alter the external readings. The graphs of FIGS. 11, 12 and 13 are exaggerated for clarity, since in actual fact the differences between the dotted and solid lines would not be as great as are indicated in the hypothetical.

A modified or second system is exemplified in FIG. 7 of the drawing and embodies improved principles of design and construction. This system preferably comprises an elongated band or enclosure 100 having a pair of contiguous or juxtaposed members 101 and 102 respectively provided with separate fluid receiving chambers 102 and 104 which preferably extend throughout an intermediate portion of the length of the band. The members are confined in the band and the latter is provided with interengaging means 105 and 106, of a conventional form, at its extremities whereby to facilitate detachably holding of the band, and particularly its member 101 in firm relation to a blood vessel of a member of an individual's body, such as an arm.

The chamber 103 is provided with a tubular fitting 107 which is communicatively connected to a reservoir 108 by a conduit or line 109 and a shutoff valve 110 and a needle valve 111, respectively corresponding to the valves 17 and 16, above referred to, are interposed therein. The other chamber 104 is adapted to contain a predetermined amount of liquid and a fitting 112 extends therefrom and is communicatively connected by a conduit or line 113 to a pressure transducer 114, the latter of which may substantially correspond to the transducer 6 above referred to. This organization affords a unique setup whereby when pressure is applied to the chamber 103 by a pump or device of the kind above described it will expand and in turn will apply external pressure to the adjacent chamber 104 and compress the latter so that the liquid therein will flow or extend to the transducer 114 which converts the variable pressures applied thereto to a receiver like 5 for view. Due to the bearing relationship of the liquid responsive chamber 104 to a blood carrying vessel, the latter will transmit its pulsing conditions to the transducer. The operation of the system illustrated in FIG. 7 substantially corresponds to the system exemplified in FIG. 1 and therefore it is not believed necessary to repeat the operation.

Figure 14:
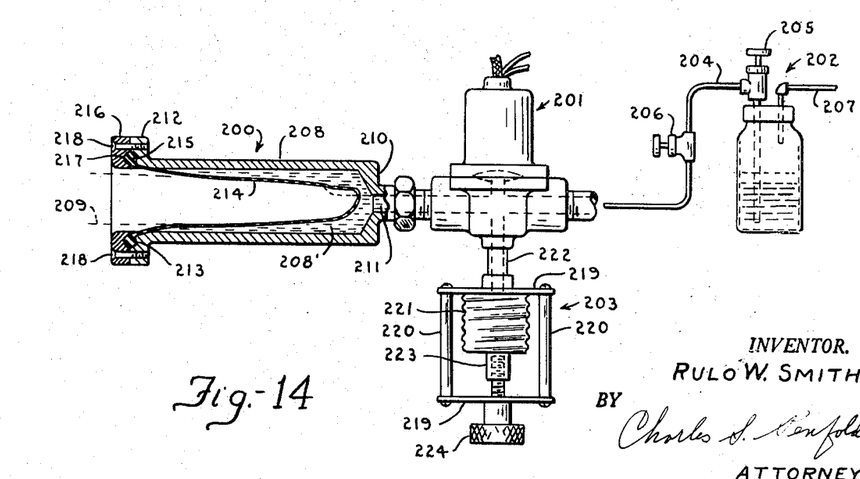
FIG. 14 is a modified or third system embodying the invention.

The modified or third system illustrated in FIG. 14 comprising a sensor assembly generally designated 200, a transducer 201, a control means 202, and an adjustable unit generally designated 203. The sensor 200 and unit 203 are substantially directly connected to the transducer and the control means 202 is connected to the transducer by a conduit or line 204 having a needle valve 205 and a shutoff valve 206 interposed therein. The control means 202 substantially corresponds to the control means 4 shown in FIG. 1 and is adapted for connection to a pressure supply through a conduit or line 207.

The sensor assembly 200 preferably includes a member 208 having an elongated cylindrical chamber 208' for receiving a digit 209, an end wall provided with a passage 211 which is communicatively connected to the transducer and a flanged entrance end 212 provided with annular concave seat 213. An elongated substantially hollow cylindrical resiliently flexible sensor element 214 is disposed in the chamber 208' and provided with an annular bead 215. A ring 216 is provided with an annular concave seat 217, and means, such as screws 218, extend through the ring and connect with the flanged end 212 for clamping the bead 215 of the sensor element in the seats. When liquid is introduced to the chamber 208' the element 214 will be forced outwardly from the chamber from whence it is forced back into the chamber by the digit to a substantially concentric portion with relation to the member 208.

The adjustable unit 203 includes a frame having a pair of parallel end members 218 secured in spaced relation by pillars 220. A bellows 221 is supported in the frame and its interior is communicatively connected to the transducer through a conduit or line 222. The bellows is provided with an internally threaded member 223 and a thumb screw 224 is connected to the outermost of the members 219 so that the size of the bellows may be readily varied by manipulating the thumb screw whereby to assist in controlling the pressure applied to the digit.

The transducer 201 is adapted for connection with a suitable receiver such as an oscilloscope as shown in FIG. 1, and a recorder may be connected to the oscilloscope.

Figure 15:
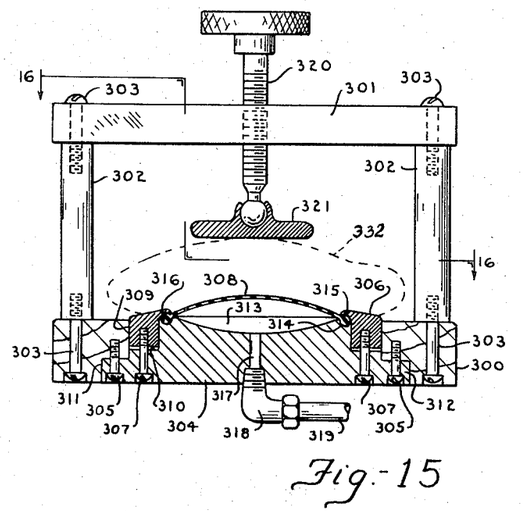
FIG. 15 is an elevational view of a modified form of a sensor assembly with portions thereof in section for the purpose of illustrating certain details of the construction.
Figure 16:
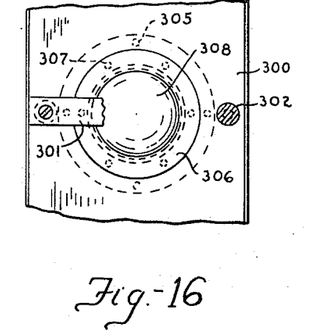
FIG. 16 is a sectional view taken substantially on line 16—16 of FIG. 15 illustrating additional details of construction.

The modified sensor assembly depicted in FIGS. 15 and 16 comprises, among other things, a base 300, an upper bar 301, and a plurality of pillars 302 which are connected to the base and bar by screws 303. An annular member 304 is preferably detachably connected to the base by screws 305 and a ring 306 is detachably connected to the annular member by screws 307 with an inelastic diaphragm 308 being secured between the annular member and ring. The base 300 is provided with an opening 309 and the member 304 with a peripheral annular recess 310, the latter of which in combination with the opening 309 defines an annular space which receives a portion of the ring 306. The base is also provided with an annular counter-recess 311 and the member 304 with a radial annular flange 312 which is received in the recess 311. The member 304 is provided with a depression 313 and with an adjacent annular concave seat 314 and the ring 306 includes an overhanging annular flange provided with annular concave seat 315, the latter of which in combination with the seat 314 receives and compresses an annular bead 316 on the diaphragm 308. The diaphragm 308 and the depression 313 each form a secondary chamber and these in combination define a primary or larger chamber. The member 304 is further provided with an axial passage 317 which is communicatively connected with the chambers. The passage 317 is counterbored and threaded to receive a threaded end of an elbow fitting 318 which is adapted for connection by a conduit 319 to a transducer in a system, such as in FIG. 1. The diaphragm is preferably normally concave-convex in shape and of a sufficient size, for example, to support an individual's hand.

The bar 301, above referred to, is disposed in spaced parallel relation to the base and carries a thumb screw 320 which is provided with a pressure shoe 321 universally connected thereto in a manner whereby the shoe through manipulation of the screw applies pressure to the back of a hand 322 for maintaining its palm firmly in engagement with the diaphragm 308 so that variable pulsing conditions in the artery or arteries of the hand will be transmitted through liquid to a transducer.

Figures 17, 18:
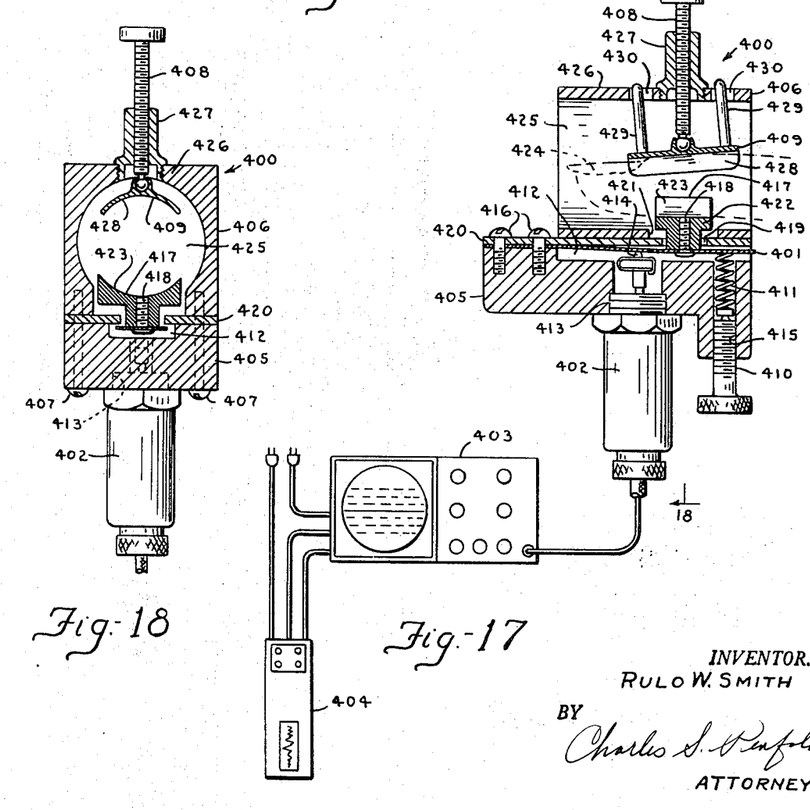
FIG. 17 is a modified or fourth system embodying the invention.
FIG. 18 is a vertical section taken substantially on line 18—18 of FIG. 17.

The modified or fourth system illustrated in FIG. 17 and a sensor assembly generally designated 400 shown in FIG. 18 and constituting a component thereof will now be described. The system comprises, among other things, the sensor assembly 400 which is provided with a sensor element 401, a transducer 402, a receiver 403, and a recorder 404. The sensor assembly and transducer are directly associated and the former includes a base 405, a block 406 secured to the base by screws 407, a thumb screw 408 carrying a pressure shoe 409 for receiving a digit and means comprising a screw 410 and a helical spring 411 for adjusting the sensor element. The base is provided with an elongated slot 412, a relatively large transverse partially threaded opening 413 which receives a threaded end of the transducer 402 and a responsive element 414 thereof, and with a smaller transverse threaded opening 415 which receives the helical spring 411 and the screw 410.

The sensor element 401 is elongated and one of its extremities is anchored to the base by screws 416 and its opposite extremity is resiliently flexible and more or less extends in the slot 412, over the opening 413, and bears against the responsive element 414 and/or an end of the helical spring 411.

A fitting 417 constituting a support or rest is preferably fixedly secured to the opposite extremity of the sensor element by a screw 418. This fitting includes a portion which extends through a clearance aperture 419 provided in an abutment or planar member 420 and through a large clearance opening 421 provided in the block 406. This fitting also includes an enlarged portion 422 provided with a concave longitudinally extending seat 423 for receiving, for example, a digit 424 of a hand. The block 406 is also provided with an enlarged cylindrical chamber 425 for receiving the digit for disposition in the concave seat 423.

The block includes an upper wall 426 provided with a threaded aperture which receives a threaded end of a tubular bearing 427 which supports the thumb screw 408 to which the pressure shoe 409 is pivotally connected. This shoe is provided with a concave longitudinal seat 428 for receiving the digit and has a pair of pins 429 which project upwardly through apertures 430 provided therefor in the upper wall 426 whereby to stabilize tilting movement of the shoe in a predetermined plane. The seat 423 and shoe 409 thus cooperate to receive and firmly embrace the digit.

Many variations in the type of receiver used are possible. FIGS. 19, 20, 21 and 22 illustrate four different types. All of the types have a cable 19 coming from the transducer and going to a low output impedance amplifier 500 which amplifies the signal from the transducer without loss of its D.C. component.

Figures 19, 20:
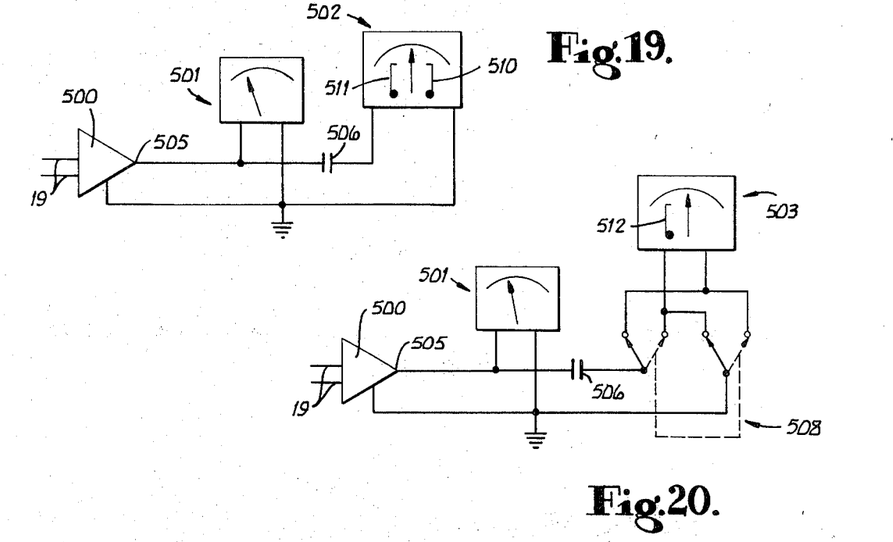
FIG. 19 is a receiver for connecting to the transducer to read average external applied pressure and peak positive or negative pulse pressure excursions.
FIG. 20 is a variation of the receiver of FIG. 19 for accomplishing the same purpose.

FIG. 19 illustrates a meter 501 which has a very heavily damped movement and which is calibrated to read 0 to 300 mm. Hg. The readings of meter 501 correspond to external pressure. A meter 502 is coupled through an oil filled capacitor 506 to the output 505 of amplifier 500. The value of the capacitor 506 is chosen such as to provide a time constant with the meter 502 of approximately 8 seconds. The meter 502 is very lightly damped and has two backup fingers 510 and 511 to enable the reading of peak positive and peak negative pulse pressure indications. To read the peaks tending to deflect the meter to the left, backup finger 511 is rotated counter clockwise to the edge of the meter case so that it is out of the way. Backup finger 510 is then rotated counter clockwise so as to press up next to the needle of the meter movement. The backup finger 510 is rotated further counter clockwise until the first point is reached where the needle does not part from the backup finger 510 during pulse pressure peaks. At this point the meter needle will be stationary and will point to the peak pulse pressure.

To read the peak pulse pressure of opposite polarity, the needle is pressed towards the right by backup finger 511 in the same manner as described above.

The receiver illustrated in FIG. 20 has identical components to the receiver illustrated in FIG. 19 except that a less expensive type meter is used and a switch reverses the polarity of the signal to the meter. The double backup finger meter 502 is replaced by a meter 503 having only a single backup finger and a double pole-double throw switch 508 which reverses the polarity of the signal so that both positive and negative peaks can be read using only one backup finger. This meter 503, since it would have about a zero to 40 mm. Hg. scale range rather than about a 40 to zero to 40 scale range, would enable increased precision in reading.

Figure 21:
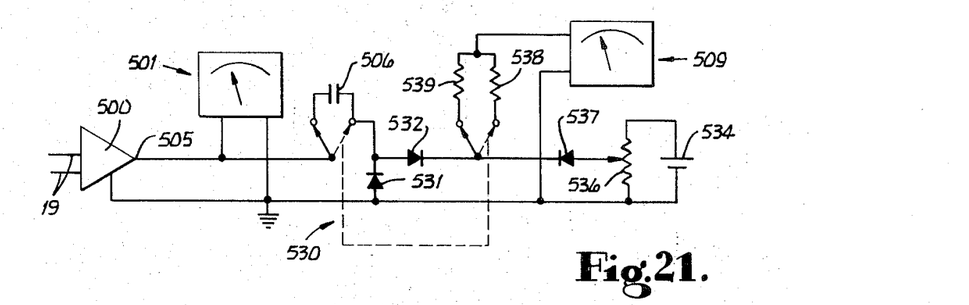
FIG. 21 is a variation of the receiver in FIG. 20 in which an electrical biasing circuit replaces the mechanical backstop on the meter movement and which will indicate peak positive pulse pressure excursions, average external applied pressure, and maximum instantaneous pressure.

The receiver illustrated in FIG. 21 is an electronic equivalent of FIG. 20 with switch 508 positioned to read peak positive pulse pressure. Capacitor 506 and meter 501 serve the same function which they did in the receivers illustrated in FIGS. 19 and 20; diodes 532 and 533 serve to direct positive voltages to the meter 509 and negative voltages to ground. The battery 534 and potentiometer 536 provide an adjustable positive voltage which can be applied to meter 509 through the diode 537. The potentiometer is the equivalent of the backup finger and it can be adjusted to a produce a minimum reading on meter 509 at which no peak positive pulse pressure indications are noticable. This will correspond to the value of the peak positive pulse pressure. Resistor 539 is chosen to give about a full scale deflection of the meter 509 at 40 mm. Hg. peak positive pulse pressure. When the double pole-double throw switch 530 is switched from the solid line to the dotted line position, actual systolic blood pressure may be read directly on meter 509, resistor 538 being chosen to give an appropriate scale deflection. Since capacitor 506 is bypassed, the D.C. component of the signal will be present. If the potentiometer 536 is adjusted to produce the minimum voltage at which the needle of meter 509 is stationary, the meter 509 will indicate a true systolic blood pressure.

Figure 22:
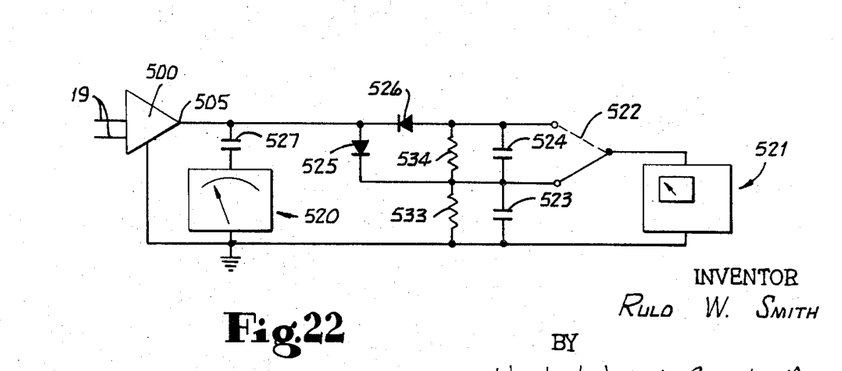
FIG. 22 is a receiver for connecting to the transducer to read actual systolic pressure or actual diastolic pressure directly and has a meter for reading pulse pressure.

FIG. 22 illustrates a simple receiver which has a direct read out of both systolic and diastolic blood pressures. A capacitor 527 couples the A.C. component of the output 505 of amplifier 500 to an A.C. voltmeter 520. This voltmeter 520 is moderately damped and is used to indicate pulse pressure. A capacitor 523 will charge through diode 525 to a voltage corresponding to the true systolic pressure (the peak voltage produced by amplifier 500). A capacitor 524, chosen to be much smaller (about 1 percent is satisfactory) in capacitance than capacitor 523, will charge through diode 526 and capacitor 523 to a voltage corresponding to the difference between the peak voltage produced by amplifier 500 and the lowest voltage produced by amplifier 500. For discharge of capacitors 523 and 524 between successive readings it is desirable to parallel each of them with a resistor (533 and 534) to give each capacitor about a 15 second time constant. A very high impedance voltmeter 521, preferably using a field effect transistor input, may be switched with switch 522 to read voltages corresponding to true systolic and true diastolic blood pressure.

It must be remembered that systolic & diastolic readings are only taken when the external pressure is equal to the pressure at natural artery size. Pressure at natural size is conveniently considered as being the minimum external pressure at which a maximum pulse pressure is indicated. In reality one may look for a maximum average pulse pressure or a maximum peak positive pulse pressure or a maximum peak negative pulse pressure since they are all proportional over the range of interest.

Having thus described my invention, it is obvious that various modifications may be made in the same without departing from the spirit of the invention and, therefore, I do not wish to be understood as limiting myself to the exact forms, constructions, arrangements, and combinations of parts herein shown and described.

The invention claimed is:

1. A method for obtaining two values of pressures which values can be added to give a resultant value very near the true systolic blood pressure comprising a mounting to a portion of an animal body a device which can apply with low compliance an adjustable external pressure to the portion of the animal body and which will indicate both an external pressure applied and a peak positive pulse pressure of the body against the device and b adjusting the external pressure applied to the portion of the body until the peak positive pulse pressure is at a maximum and the external pressure applied is at the lowest value at which the maximum pulse pressure is obtained, at which point the value of the peak positive pulse pressure added to the external pressure will give the resultant value very near the true systolic blood pressure.

2. A method for obtaining two values of pressures which values can be added to give a value very near the true systolic blood pressure comprising:

a mounting to a portion of an animal body a device which can apply with low compliance an adjustable external pressure to the portion of the animal body and which will indicate both an external pressure applied and a peak positive pulse pressure of the body against the device and b adjusting the external pressure applied to the portion of the body to the highest pressure below the lowest external pressure at which the pulse pressure is a maximum and which highest pressure has a pulse pressure less than at a slightly lower pressure, at which point the value of the peak positive pulse pressure added to the external pressure will give a resultant value very near the true systolic blood pressure.

3. An apparatus for measuring actual blood pressure comprising: (a) a display means (b) a transducer for producing electrical signals representative of pressure variations, (c) means for transmitting signals from said transducer to said display means, (d) a liquid-filled sensor adapted for association with an animal body part, (e) a pump (f) means operatively connecting said transducer and said liquid-filled sensor, (g) a reservoir having a chamber containing liquid and a barrier, (h) a first conduit means for connecting said chamber above said barrier with said pump, and (i) a second conduit means for connecting said sensor with said chamber below said barrier and which has continuously adjustable valve means.

* * * * *